April 22, 1924.　　　　　　　　　　　　　　　　　　　1,491,679
E. S. DANIELS
AUTOMATIC TRIMMING, GROOVING, AND STRIP INSERTING MACHINE
Filed Nov. 19, 1923　　　2 Sheets-Sheet 1
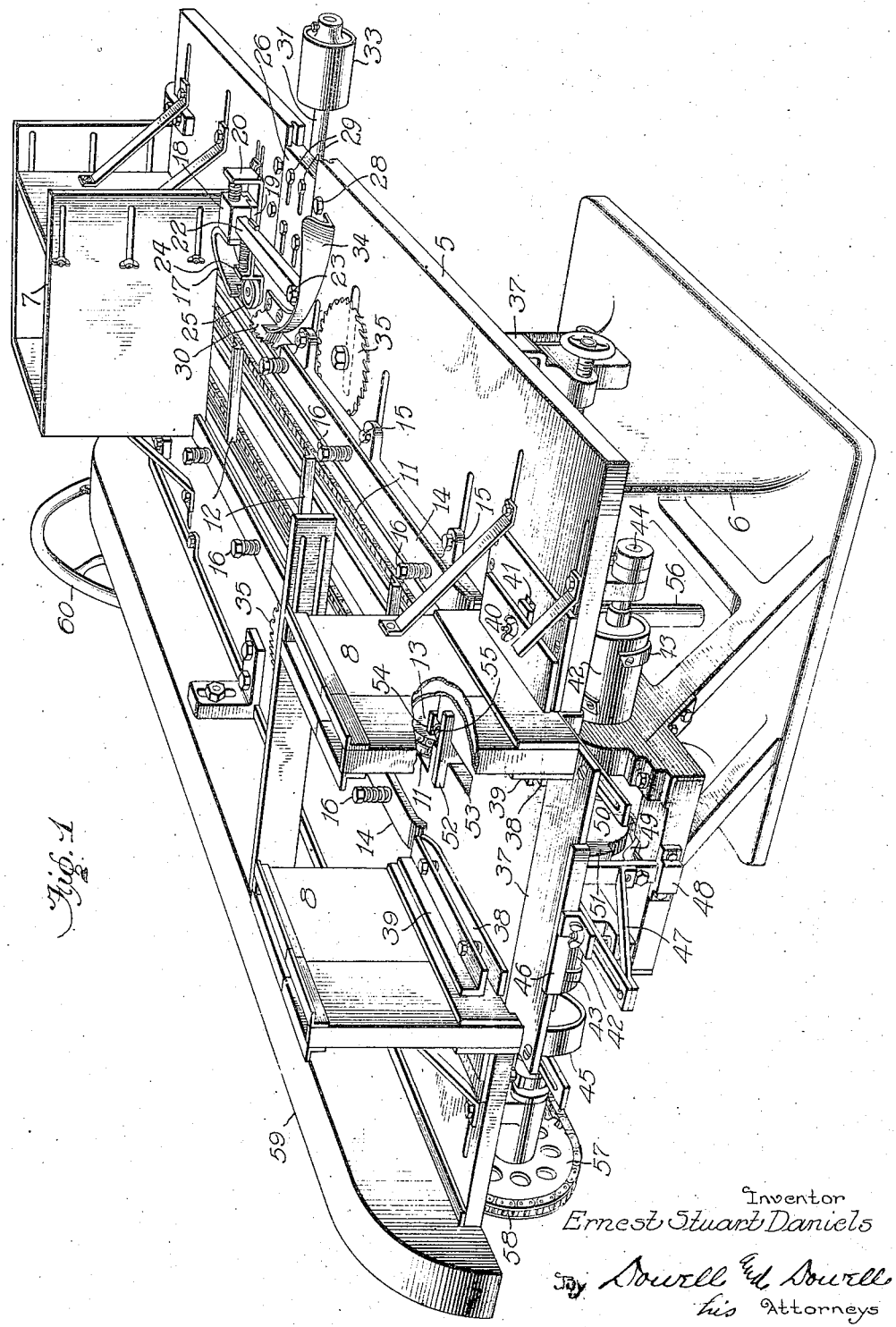
Inventor
Ernest Stuart Daniels
By Dowell & Dowell
his Attorneys April 22, 1924.
E. S. DANIELS
1,491,679
AUTOMATIC TRIMMING, GROOVING, AND STRIP INSERTING MACHINE
Filed Nov. 19, 1923      2 Sheets-Sheet 2
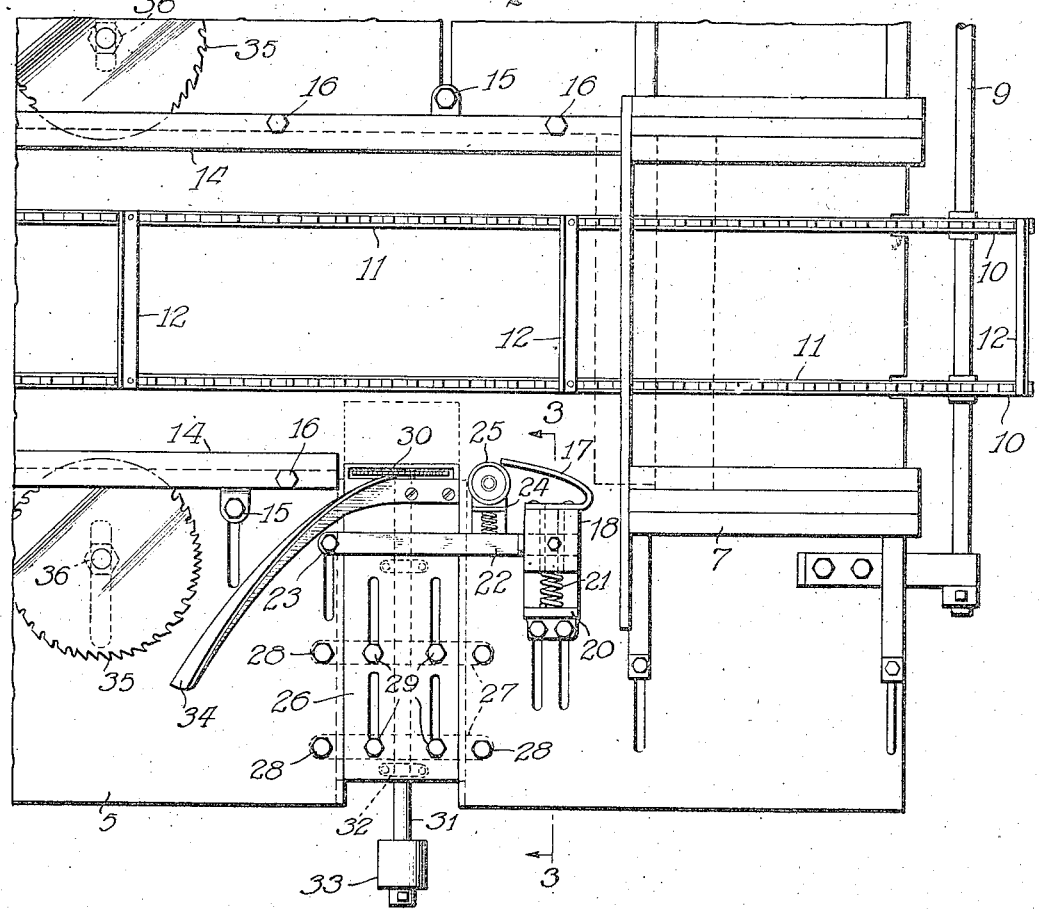
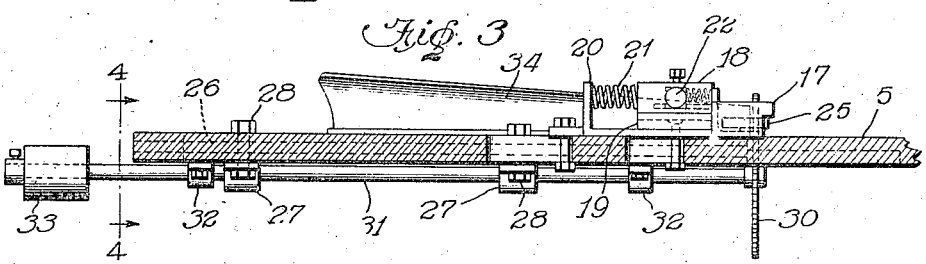
Inventor
Ernest Stuart Daniels
By Dowell and Dowell
his Attorneys Patented Apr. 22, 1924.

1,491,679

UNITED STATES PATENT OFFICE.

ERNEST STUART DANIELS, OF WASHINGTON, DISTRICT OF COLUMBIA.

AUTOMATIC TRIMMING, GROOVING, AND STRIP-INSERTING MACHINE.

Application filed November 19, 1923. Serial No. 675,767.

*To all whom it may concern:*

Be it known that I, ERNEST STUART DANIELS, a subject of the King of England, residing at Washington, in the District of Columbia, have invented certain new and useful Improvements in Automatic Trimming, Grooving, and Strip-Inserting Machines; and I do hereby declare the following to be a full, clear, and exact description of the invention, such as will enable others skilled in the art to which it appertains to make and use the same.

This invention relates to machines for manufacturing wooden shipping cases or crates and more particularly to machines for cutting and forming the end pieces or sections of packing boxes or cases for petroleum or general merchandise, for which a strong, protective and non-collapsible container may be required adequately to protect the goods from injury incident to careless and rough handling during shipment.

The invention is an improvement upon the machine shown and described in my Patent No. 1,471,246, dated October 16, 1923, and the principal object is to provide a machine for automatically trimming or cutting odd or irregular lengths of boards, planks and united panel sections, to uniform lengths; for cutting grooves in the ends of the trimmed boards or sections and for applying strips to the grooved ends to form reinforced and composite flooring and packing case or box-end sections or panels which will not collapse or break apart, even though cracks or splits may occur in the wood.

A further object is to provide a machine of the character referred to which will be simple in construction, efficient in operation and comparatively inexpensive of manufacture.

The invention will first be hereinafter more particularly described with reference to the accompanying drawings which are to be taken as a part of this specification and then pointed out in the claims at the end of the description.

In said drawings, Fig. 1 is a perspective view of the assembled machine.

Fig. 2 is an enlarged, detail plan view of the machine table or platform, showing the adjustable sliding panel by which the trimming blade with associated parts, is movably carried.

Fig. 3 is a view taken on the line 3—3 of Fig. 2, the machine table being shown fragmentarily in section and the trimming blade and cooperable parts being shown in elevation; and Fig. 4 is an enlarged fragmentary side elevation of the working table or platform taken on the line 4—4 of Fig. 3, showing the blade-carrying panel in end elevation to illustrate its sliding connection therewith, the cutter and associated parts being omitted.

The invention consists generally in the arrangement of saws or other cutting means for first trimming or cutting odd pieces of boards, planks or united panel sections, to uniform lengths and then grooving or kerfing the edges of the boards, planks or sections to be operated upon, the articles being fed to the cutters, one piece at a time, by suitable conveying mechanism. After the cutting or kerfing operation, the grooved boards or planks are fed forward to a mechanism for applying the narrow strips to the kerfs, and after the latter operation, the completed and reinforced box-end panels are discharged from the machine.

Referring to the drawings in which like reference numerals are used to designate corresponding parts throughout the several views, 5 denotes a platform or table supported at a convenient height above the floor by a standard or pedestal 6, the latter being securable to the floor in any desired manner.

Adjustable hoppers 7 and 8 are arranged or mounted on opposite sides or ends of the table, the former being adapted to contain odd or irregular lengths of boards or other articles to be grooved or kerfed, while the spaced hoppers 8 are adapted to contain uniform shooks or strips to be applied in the ends of the grooved articles. The articles and strips are stacked one upon the other in the respective hoppers 7 and 8 and the lowermost in each are allowed to be periodically and successively withdrawn therefrom by mechanism to be hereinafter described.

A driven shaft 9 (shown in Fig. 2) is journaled in adjustable bearings subjacent one end of the table, said shaft having a pair of spaced sprockets 10 keyed thereto, over which a pair of endless conveyor chains 11 are passed, said chains being cooperable and adapted to move longitudinally of the table within spaced longitudinal receptive grooves provided in its surface. The chains 11 are also cooperatively united by spaced crossbars 12 which are secured to the upper faces of the chains and move laterally therewith along the surface of the table.

The sprockets 10 are arranged on the driven shaft 9 in line with the longitudinal grooves in the surface of the table, so that the chains 11, carried thereover, will pass directly beneath the hopper 7, the rear and front walls of the latter being recessed or cut away sufficiently to permit the cross-bars 12 to pass laterally through the hopper, successively engaging and withdrawing the lowermost board or section therefrom.

The endless chains 11 also engageably pass over a similar pair of sprockets 13 secured to an idling shaft (not shown), the latter being supported in bearings located below the table intermediate its ends, so that the chains in spanning the distance between sprockets 10 and 13, rest by virtue of their own weight within the longitudinal grooves provided in the surface of the table, which are preferably of a depth sufficient for the upper faces of the chains to be flush with the table surface.

Opposed adjustable and yieldable guides 14 are arranged upon either side of the article conveyor, substantially parallel and co-extensive therewith, said guides being preferably formed in two parts, the lower of which are adjustably secured to the surface of the table by means of clamping bolts 15 extended through apertured integral lugs which overlie transverse slots provided in the table, the upper parts of the guide members being somewhat wider than the lower parts or formed with overhanging marginal portions projecting toward the conveyor, under which the edges of the boards or articles to be grooved, are depressingly confined. The upper parts of said guides are yieldingly secured to the lower parts, by upright headed studs or bolts 16 threaded in orifices provided therein, and each stud or bolt carries an encircling expansible spring bearing against its head and against the top surface of the guide member, tending to depress the latter with a force sufficient to maintain a yielding pressure upon the underlying edges of the boards or articles as they are conveyed through the machine.

As the lowermost articles contained within the hopper 7 are successively withdrawn therefrom by the conveyor, their ends are initially moved against a resilient spring element 17 by which they are forced with their opposite ends yieldingly pressed under and against the guide 14 opposed thereto. Said spring element is preferably of semi-elliptical form and secured to a sliding block 18 having a dove-tail tongue and groove connection with a complementary block 19, the latter being swiveled to an adjustable angular bracket 20' which is rigidly secured to the table by clamping bolts extending through transverse slots provided therein.

An expansible spring 21 supported by a span pin or bolt, is provided between the rear face of the block 18 and an upright shoulder of the bracket 20, by which said block is yieldingly pressed at substantially right angles toward the conveyor.

A swinging rod or bar 22 is also provided, said rod having one end fitted loosely within a receptive recess formed in the block 18, its other end being pivotally secured to an adjustable swivel-bolt 23, as clearly shown in Figs. 1 and 2.

The swinging bar 22 carries a reciprocable bracket 24, the free end of which extends through a rectangular recess formed in the bar and an expansible spring is provided between said bar and an upright shoulder on the bracket, tending to hold the latter extended toward the conveyor at substantially right angles thereto. An idling roller 25 is carried on the inwardly extended end of bracket 24, said roller being thus adapted to exert a yielding pressure upon the edges or sides of articles conveyed toward the cutters, to firmly hold the same in position against the guide 14, prior to and during the trimming or cutting operation.

One side of the table 5 (at a point preferably below the swinging bar 22) is cut away or formed with an open-ended rectangular recess, the opposed and parallel recess edges of the table being grooved to provide a guideway for a sliding panel 26, the latter being provided with extended flanges or tongues adapted to engage and fit within the grooved edges of the table. The panel is transversely adjustable with respect to the table, by means of stationary cross-bars 27 secured against the under surface of the table by bolts 28, said cross-bars carrying fixed clamping studs or bolts 29 extending upwardly through corresponding slots provided in the panel, by which the latter is bolted rigidly in place.

The panel 26 carries a vertically revoluble trimming blade or cutter 30 which projects through an elongated slot formed therein, said cutter being keyed to one end of a rapidly rotatable shaft 31 journaled in fixed bearings 32, which are rigidly secured to the under side of the panel. An ordinary adjustable belt pulley 33 is provided on the opposite end of the shaft 31 by which the latter may be rotated from any suitable source of power.

The panel 26 also carries a deflector-plate 34 by which the odd or trimmed ends of the conveyed boards or sections, are diverted from the adjacent grooving cutter and thrown off the table.

Kerfs or grooves are formed or cut in the edges of the boards or sections as they are conveyed forward through the machine by means of horizontal rotary cutter blades or saws 35 arranged on either side of the conveyor with their cutting edges in the path of travel of the articles to be treated. Said cutter blades are supported on adjustable shafts 36, and the latter are journaled in bearings carried by vertically and horizontally adjustable brackets 37 located beneath the table. The shafts 36 project above the table surface through elongated slots (shown in Figs. 1 and 2) disposed substantially at right angles to the conveyor, so that the shafts carrying the cutters may be moved toward or away from the conveyed articles to present a greater or lesser cutting edge thereto as desired. The breadth of the groove cut in the articles will of course depend upon the thickness of the cutters, or the number of blades applied to the ends of the shafts.

After the boards have been grooved or kerfed, they are delivered successively onto a platform portion 37 which underlies the spaced adjustable hoppers 8, where the shooks or wooden strips are inserted in the cut grooves. A spaced pair of pressure runners 38 overlie the platform 37 and are adapted to receive the grooved boards or articles and exert a yielding pressure upon the top edge surfaces thereof in a manner similar to the guides 14, to hold the articles in rigid position during the "strip-inserting" operation. Said runners are curved upwardly at their receptive ends to deflect the articles fed toward the platform by the conveyor and reciprocable connector bolts encircled by compression springs are provided to yieldingly support the runners from angle bars 39, the latter being rigidly secured to the respective hoppers 8.

The spaced adjustable hoppers 8 are arranged immediately adjacent to and substantially parallel with the respective grooved edges of the boards as they lie upon the platform 37 and are comparatively narrow in width in order to accommodate the shooks or strips for application to the boards.

Each of said hoppers is formed with a feed opening in its lower end facing toward a grooved end or edge of boards or articles delivered to the platform, through which at proper intervals and one at a time from each, strips are simultaneously released and forcefully pressed into the adjacent opposing grooves at opposite ends or edges of the board.

The mechanism for effecting this "strip-inserting" operation, comprises a pair of adjustable actuating members or sliding blocks 40 arranged one beneath the lower end of each hopper 8 and cooperatively movable toward and away from each other. These slides correspond approximately in length and thickness, with the shooks or strips within hoppers 8 and in their movement toward each other, they encounter and engage the lowermost strip from the respective hoppers, forcing the same in their continued movement from under the hoppers and into the opposing groove of the board held rigidly upon the platform. The reciprocal operation of slides 40 is accomplished as follows:

Each slide block 40 carries a depending push-pin or stud extending through elongated openings or slots 41 in the table 5, the lower extremities thereof resting upon cams 42 provided with eccentric cam surfaces 43 which simultaneously operate against said studs to move the latter together with the slides, toward and away from each other. The cams 42 are keyed to a driven shaft 44, the latter being journaled in bearings subjacent the table, and provided with a gear, sprocket wheel or belt pulley 45 by which it may be rotated from a suitable source of power.

In order that boards fed to the platform 37 by the conveyor may be properly positioned and held rigidly in place, an adjustable stop member is provided, said stop including an upright plate 46, slidingly adjustable upon a vertically movable bracket 47, the latter having a depending arm slidably fitted within a sleeve or bearing block 48 and a contracting spring (not shown), the ends of which are connected respectively to the table and said arm of the bracket for normally holding the latter in raised position where the stop-plate will project slightly above the upper surface of the platform, so that a plank or board conveyed onto the platform may not be moved beyond the inner edge thereof.

After the "strip-inserting" operation, the stop-plate 46 is dropped below the level of the platform in order that the board may be removed therefrom. For such purpose, the depending arm of the bracket 47 carries a rearwardly extending rigid arcuate arm 49 underlying a cam wheel 50 on the shaft 44, said wheel having a cam surface 51, which at each revolution (after the "strip-inserting" operation) moves into contact with the arcuate member 49 and depresses the same together with the bracket 47 thus causing the stop-plate to move below the level of the platform so that the completed boards or panels may be pushed or removed therefrom. After the cam surface 51 has moved beyond engagement with the arm 49, during which movement the next succeeding board (impelled forward by the conveyor) has engaged and pushed the completed board off the platform, the contracting spring hereinbefore mentioned, draws the bracket 47 and the parts carried thereby, to normal position, so that the stop-plate 46 will confront the next succeeding grooved board or panel as it is subsequently pushed forward into position for receiving the strips.

The grooved articles discharged onto the platform by the conveyor, are forced into proper position between the spaced hoppers 8 by means of a yieldable push-plate 52. Said plate is preferably of "T-shaped" form, the depending central portion thereof being extended into or through a rectangular opening or recess 53 in the platform 37, so that the push-plate may move transversely back and forth in the path of travel of the conveyed articles. The push-plate is movable with an angular bracket 54, an arm of which extends upwardly through the recess 53 and is yieldingly secured to the plate by means of a reciprocal stud or bolt encircled by an expansible spring 55.

The other arm of the bracket 54 extends horizontally (subjacent the table) toward the stop-plate 46 and is slidably fitted in sleeves or bearing blocks secured to the table, a depending catch finger being formed on its extended extremity, adapted to releasably engage the leading edge of cam surface 51 on the cam 50, by which the bracket 54 carrying the push-plate 52 is drawn forward on each revolution of the cam. One end of a chain or cable passing over an idling pulley (not shown) is secured to the bracket 54, its other end being secured to a weight 56 against which the bracket is intermittently drawn forward, and said weight returns the bracket and push-plate to normal position as soon as the catch finger releases from the cam surface 51.

It will be noted that the push-plate is not actuated until the stop-plate has returned to normal position, since the conveyor alone impels each successive board or panel forward sufficiently to expel the preceding board from the platform before the push-plate is brought into operation.

The entire mechanism may be actuated by an ordinary belt or chain driven from a suitable source of power, and for such purpose the gear, sprocket wheel or pulley 45 (above mentioned) is provided on the shaft 44. A sprocket 57 is also keyed to said shaft and a similar sprocket (not shown) is provided on the driven shaft 9, over which a spanning drive chain 58 is engageably passed for transmitting power to the latter. A guard 59 is placed over the spanning chain as a precaution against accident, and a hand-wheel 60 is also releasably secured to one end of the shaft 9 in order that the latter may be manually rotated for purposes of adjustment.

The operation of my improved device is as follows:

Sections of boards, planks or other material of odd, even or irregular lengths and widths are stacked one upon the other in hopper 7, which as hereinbefore mentioned, is adjustable in order to accommodate articles of varying dimension. The spaced cross-bars carried by the endless, continuously moving conveyor, successively engage the lowermost sections within the hopper and withdraw the same therefrom, moving the articles across the table in the path of the cutter blades. The spring element 17 initially presses the articles against the opposite yieldable guide 14, by which they are "squared," and the roller 25 exerts a yielding pressure against the ends or edges of the articles, just prior to and during the trimming or cutting operation, to prevent their dislodgment or disengagement with the guide 14. If the articles are of such dimension that excessive pressure or strain results upon the spring element 17 or the roller-carrying bracket 24, the sliding block 18 on the end of the swinging bar 22, will be pressed and moved away from the conveyor against the tension of its associated spring, thereby alleviating the extreme pressure exerted upon the articles but applying a compound pressure thereagainst.

As the articles are conveyed forward against the trimming blade 30, they will be cut to a predetermined uniform length, the position of said cutter being adjustable by means of the transverse sliding panel 26 above described in detail. Continued progress of the articles through the machine brings them into cutting contact with the respective opposed grooving blades 35, by which parallel kerfs or grooves of the desired depth are cut in their opposed ends or edges.

After the trimming and grooving operations, the articles are discharged by the conveyor onto the platform 37 against stop-plate 46 for the "strip-inserting" operation, and the push-plate 52 forces them into proper position with their edges depressingly engaged by the runners 39 which hold them in rigid position.

As the adjustable strip-appliers 40 are moved toward each other by the cams 42, they engage the lowermost strip released from the respective hoppers 8 and force the strips firmly in place within the opposing grooves of the board. When this application has been effected, the actuating members retract. Simultaneously, the stop-plate moves below the level of the platform and the finished board or article is discharged from the machine by the pressure of the succeeding board thereagainst as the latter is moved into position on the platform, whereupon the stop-plate returns to normal position to confront the succeeding board before the push-plate 52 is actuated to move it into position for the "strip-insertion."

Having thus described my invention, what I claim as new and desire to secure by Letters Patent of the United States is:

1. In a wood trimming, grooving and strip-inserting machine, the combination with a table, of a hopper mounted on said table adapted to contain articles to be treated, an endless continuously moving conveyor located below said hopper and adapted to remove and convey articles therefrom, means for trimming or cutting the articles to a predetermined uniform dimension while carried by said conveyor, said means comprising a slidably adjustable panel clamped to said table, a rotary cutter blade carried by said panel disposed in the path of travel of said articles and adapted to cutting contact therewith at substantially right angles thereto, a bar pivoted at its rear end and yieldingly pressed at its forward end toward the plane of the cutter blade and yieldable roller and spring compound pressure elements carried by said bar for pressing and holding the articles in proper position prior to and during the trimming operation, and means for cutting grooves in said articles while carried by said conveyor.

2. In a wood trimming, grooving and strip-inserting machine, the combination with a table, of a hopper mounted on said table, adapted to contain articles to be treated; an endless, continuously moving conveyor located below said hopper and adapted successively to remove and convey articles therefrom, means for trimming or cutting the articles to a predetermined uniform dimension while carrie by said conveyor, said means comprising a slidably adjustable panel clamped to said table; a rotary cutter blade carried by said panel, disposed in the path of travel of said articles and adapted to cutting contact therewith at substantially right-angles thereto; a bar pivoted at its rear end and yieldingly pressed at its forward end toward the plane of the cutter blade; an article-engaging spring member carried at the forward end of said bar, and a yieldable roller and spring compound-pressure element carried by said bar intermediate its ends for co-operatively pressing and holding the articles in proper position prior to and during the trimming operation, and means for cutting grooves in said articles while carried by said conveyor.

3. In a wood trimming, grooving and strip-inserting machine, the combination with a table, of a hopper mounted on said table, adapted to contain articles to be treated; an endless, continuously moving conveyor located below said hopper and adapted successively to remove and convey articles therefrom, means for trimming or cutting the articles to a predetermined uniform dimension while carried by said conveyor, said means comprising a slidably adjustable panel clamped to said table; a rotary cutter blade carried by said panel, disposed in the path of travel of said articles and adapted to cutting contact therewith at substantially right-angles thereto; a swinging bar pivoted at one end, a yielding slidable block through which the opposite end of said bar extends, a resilient article-engaging member carried by said block, and a yieldable spring-pressed roller element carried by said bar, forming compound pressure elements therewith for pressing and holding the articles in proper position prior to and during the trimming operation, and means for cutting grooves in said articles while carried by said conveyor.

4. In a wood trimming, grooving and strip-inserting machine, the combination with a table, of a hopper mounted on said table adapted to contain articles to be treated, an endless continuously moving conveyor located below said hopper and adapted to remove and convey articles therefrom, means for trimming or cutting the articles to a predetermined uniform dimension while carried by said conveyor, said means comprising a slidably adjustable panel clamped to said table, a rotary cutter blade carried by said panel disposed in the path of travel of said articles and adapted to cutting contact therewith at substantially right-angles thereto; a swinging truss bar pivoted at one end to the table, a spring-pressed compound sliding block through which the opposite end of said bar freely extends, said block being yieldingly pressed toward the plane of the cutter blade; a resilient article-engaging member carried on the forward end of said block, a spring-pressed yieldable roller element carried by said bar intermediate its ends, said roller and said resilient member, together with said swinging bar, forming compound pressure elements for pressing and holding the articles in proper position prior to and during the trimming operation, and means for cutting grooves in said article while carried by said conveyor.

In testimony whereof I affix my signature in the presence of two witnesses.

ERNEST STUART DANIELS.

Witnesses:
ANNA J. ANDERSON,
HAROLD P. SCHUCK.